(12) United States Patent
Fox et al.

(10) Patent No.: US 8,843,886 B2
(45) Date of Patent: *Sep. 23, 2014

(54) DISTRIBUTED, NON-INTRUSIVE CODE REVIEW IN A DEVELOPMENT ENVIRONMENT

(71) Applicant: International Business Machines Corporation, Armonk, NY (US)

(72) Inventors: Joshua Fox, Emek Haela (IL); Michael Pelts, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/875,474

(22) Filed: May 2, 2013

(65) Prior Publication Data

US 2013/0239087 A1 Sep. 12, 2013

Related U.S. Application Data

(63) Continuation of application No. 13/022,159, filed on Feb. 7, 2011, now Pat. No. 8,627,279.

(51) Int. Cl.
*G06F 9/44* (2006.01)

(52) U.S. Cl.
USPC .......................................................... 717/113

(58) Field of Classification Search
None
See application file for complete search history.

(56) References Cited

U.S. PATENT DOCUMENTS

| | | | |
|---|---|---|---|
| 7,500,222 B2 | 3/2009 | Bates et al. | |
| 7,562,344 B1 | 7/2009 | Allen et al. | |
| 7,904,802 B1 * | 3/2011 | Kolawa et al. | 715/230 |
| 2005/0114841 A1 | 5/2005 | Moskowitz et al. | |
| 2006/0059455 A1 | 3/2006 | Roth et al. | |
| 2006/0150150 A1 * | 7/2006 | Tiwari et al. | 717/110 |
| 2007/0283325 A1 * | 12/2007 | Kumar et al. | 717/122 |
| 2008/0295085 A1 * | 11/2008 | Rachamadugu et al. | 717/159 |
| 2009/0271768 A1 | 10/2009 | Goodson et al. | |
| 2009/0276752 A1 | 11/2009 | Sharma | |
| 2010/0077375 A1 | 3/2010 | Millmore | |

FOREIGN PATENT DOCUMENTS

WO 2007121384 10/2007

OTHER PUBLICATIONS

Moran Shochat et al., "See Code—A Code Review Plug-In for Eclipse", LNCS 5394' pp. 205-209, 2009. URL: http://portal.acm.org/citation.cfm?id=1533856.

(Continued)

*Primary Examiner* — Philip Wang
(74) *Attorney, Agent, or Firm* — Joe Polimeni; Edell, Shapiro & Finnan, LLC

(57) ABSTRACT

Code review is performed by initiating a source code editing session associated with a first user, where the source code editing session is controlled by a computer-based source code editing tool that is configured to accept changes to source code of a computer-based software application during the source code editing session, displaying on a computer display, in the context of the source code editing session, a source code portion of the computer-based software application, and displaying on the computer display, in the context of the source code editing session, a visual indicator that is associated with the source code portion, and that indicates that the source code portion was added or modified by a second user.

12 Claims, 7 Drawing Sheets

(56) References Cited

OTHER PUBLICATIONS

Bertrand Meyer, "Design and Code Review S in the Age of the Internet", IBM Systems Journal, vol. 15, No. 3, 1976, pp. 182-211; URL: http://se.ethz.ch/~meyer/publications/acm/code_reviews.pdf.

IBM, "Immediate Highlighting of Changes in Code in Collaborative Development", ip.com, document No. IPCOM000180112D, Mar. 4, 2009.

* cited by examiner

```
String aqlString = "select R.match as annot into USPhone from Regex(/60(
runner = AQLRunner.compileStr(aqlString);
runner.setWriteStatus(false);
runner.setWorkingDir(DICT);
runner.setBufferOutput();
runner.setPushInput(1);

runner.pushDoc(readFile(docsfileName));
for (int i = 0; i <runner.getValidOutputNames().size(); i++) {
    String outputName = runner.getValidOutputNames().get(i);
    System.out.println(outputName);
    runner.getResults(outputName);
    n(tups.toString());
```

Flag the line as reviewed
Flag the function as reviewed
Flag the file as reviewed

Fig. 6

DISTRIBUTED, NON-INTRUSIVE CODE REVIEW IN A DEVELOPMENT ENVIRONMENT

CROSS REFERENCE TO RELATED APPLICATIONS

The present application claims priority to U.S. Nonprovisional application Ser. No. 13/022,159, filed 7 Feb. 2011 and entitled "Distributive, Non-Intrusive Code Review in a Development Environment," the disclosure of which is incorporated herein by reference in its entirety.

BACKGROUND

1. Technical Field

The invention relates generally to computer-based systems and methods for reviewing computer software source code.

2. Discussion of the Related Art

Code review refers to the process of examining computer software source code, for example, in order to identify programming defects or security vulnerabilities. In many organizations, a computer-based source code control (SCC) system is used to keep track of changes made to source code during software development, and a code review tool that works within or otherwise with the SCC system is used to perform code review of the source code. Typical code review tools highlight recently added or modified source code, such as to indicate to a reviewer what source code requires review, and track the reviewed parts of the source code. Typical code review tools are designed for formal code review sessions that are conducted as a separate step in the software development life cycle.

BRIEF SUMMARY

An example embodiment of the invention comprises a method for code review, the method comprising initiating a source code editing session associated with a first user, where the source code editing session is controlled by a computer-based source code editing tool that is configured to accept changes to source code of a computer-based software application during the source code editing session, displaying on a computer display, in the context of the source code editing session, a source code portion of the computer-based software application, and displaying on the computer display, in the context of the source code editing session, a visual indicator that is associated with the source code portion, and that indicates that the source code portion was added or modified by a second user.

In another example embodiment of the invention, a method is provided for code review, the method comprising providing a source code portion of a computer-based software application to a set of users for editing in a plurality of source code editing sessions, providing a first review level indicator to each of the users in the set of users, where each first review level indicator indicates that the source code portion was added or modified by a first user and that the source code portion is at a first level of review, receiving a review event indicator from any of the users in the set of users, where the review event indicator indicates that a review event related to the source code portion has occurred, and providing a second review level indicator to each of the users in the set of users, where each second review level indicator indicates that the source code portion was added or modified by a first user and that the source code portion is at a second level of review that indicates a greater level of review than the first level of review.

Other example embodiments of the invention comprise systems and computer program products for implementing the methods described above.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIG. 6 is a simplified graphical user interface illustrating features of an example embodiment of the invention.

DETAILED DESCRIPTION

Figure 1:
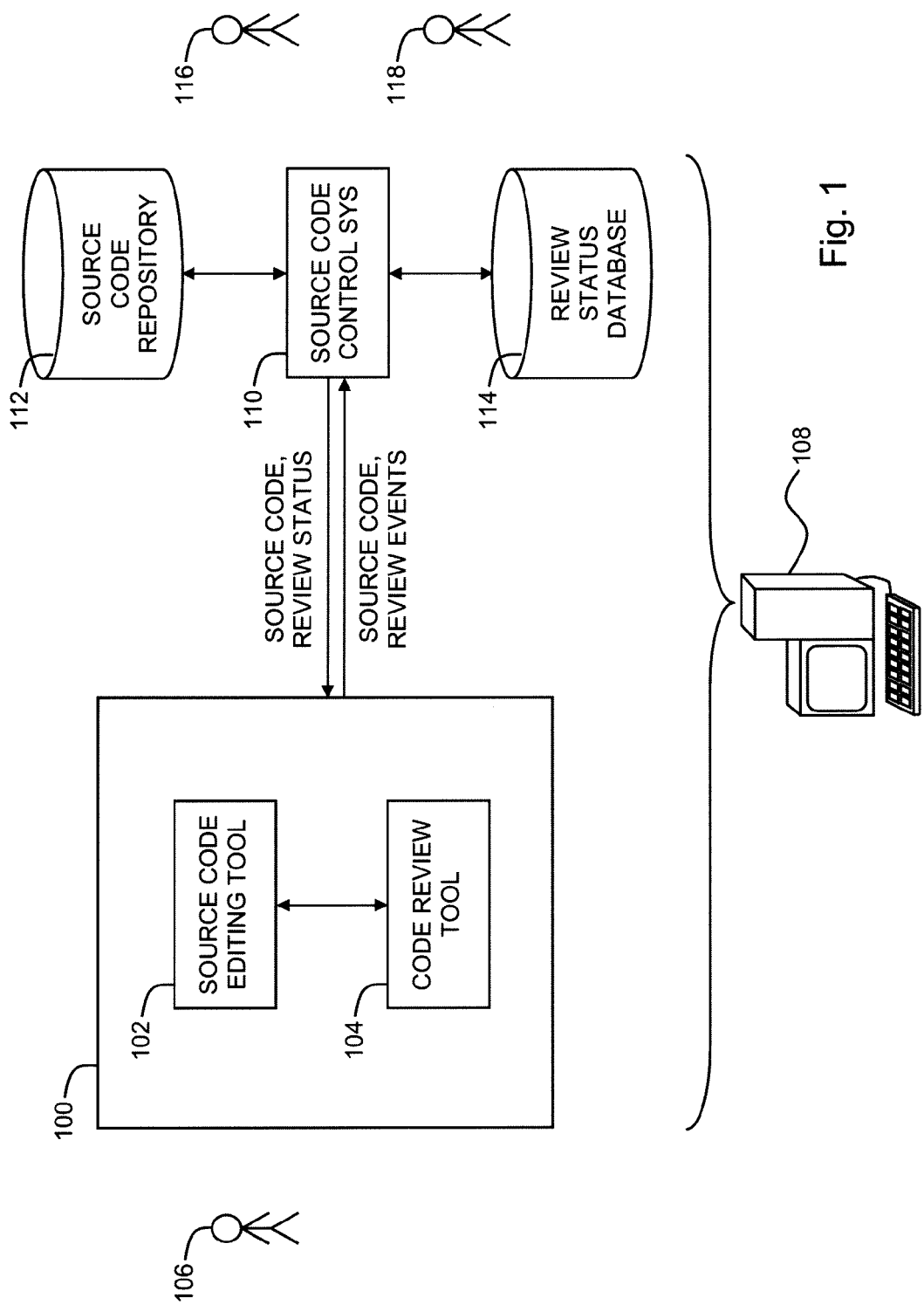
FIG. 1 is a simplified conceptual illustration of a code review system, constructed and operative in accordance with an example embodiment of the invention.

The invention is now described within the context of one or more example embodiments, although the description is intended to be illustrative of the invention as a whole, and is not to be construed as limiting the invention to the example embodiments shown. It is appreciated that various modifications may occur to those skilled in the art that, while not specifically shown herein, are nevertheless within the true spirit and scope of the invention.

As will be appreciated by one skilled in the art, embodiments of the present invention may be embodied as a system, method or computer program product. Accordingly, features of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, features of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations in relation to features of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Example embodiments of the present invention are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a code review system, constructed and operative in accordance with an example embodiment of the invention. In the system of FIG. 1, an integrated coding and reviewing environment 100 is shown, where integrated coding and reviewing environment 100 includes a source code editing tool 102 and a code review tool 104. Source code editing tool 102 is configured to initiate a source code editing session associated with a computer user, such as a user 106. During the source code editing session, source code editing tool 102 displays one or more portions of source code of a computer-based software application on a computer display, such as of a computer 108, and may accept changes to the source code, such as are made by user 106. Source code editing tool 102 is configured to access or otherwise receive the source code, such as from a source code control system 110, which may be any computer-based system that maintains a repository 112 of source code. Source code editing tool 102 is also configured to access or otherwise receive a review status associated with any portion of the source code, such as from source code control system 110 that maintains a database 114 of the review status of the source code in source code repository 112.

In accordance with the invention, when any portion of the source code is added or modified, a review status associated with the added or modified source code portion is set to indicate that the source code portion requires review. The review status may indicate any review status information known in the art of code review, as well as any of the following information:

the identity of the computer user or users who added or modified the source code portion, such as users 116 and 118
  the time and/or date when the addition or modification occurred
  the identities of other users who are to review the source code portion
  a level of review that the source code portion has undergone since the addition or modification occurred, such as using a predefined scale of review levels or using a predefined criteria to determine the review level. The review level may be maintained irrespective of who reviews the source code portion, and/or a different review level may be maintained for different reviewers.

Code review tool 104 is configured such that for any source code portion that is displayed by source code editing tool 102 on a computer display in the context of a source code editing session associated with a first computer user, code review tool 104 displays on the computer display a visual indicator associated with the displayed source code portion, where the source code portion has an associated review status that indicates that the source code portion was added or modified by one or more other computer users and requires review by the first user. Code review tool 104 is preferably configured to detect the occurrence of a review event associated with the source code portion. In certain example embodiments of the invention, the review event is the receipt of an input that is associated with the source code portion and that is of a predefined type that represents a review event. The input may, for example, be in the form of a mouse click on a displayed menu selection indicating that the first user has reviewed the source code portion, or may be in the form of a modification made by the first user to the source code portion, where changing the source code portion is considered tantamount to having reviewed the source code portion. In other example embodiments of the invention, the review event is considered to have occurred if the source code portion has been displayed for at least a predefined amount of time or on at least a predefined number of occasions or on at least a predefined number of days in the context of at least one source code editing session associated with the first user.

Code review tool 104 may be configured to cease to display the visual indicator after detecting the review event. Code review tool 104 may also be configured to display a different visual indicator after detecting the review event. For example, the different visual indicator may be one of a predefined sequence of indicators indicating increasing age of the added or modified source code portion and/or that a series of other review events has occurred, such as being of increasingly lighter shades and/or smaller sizes than the visual indicator that was displayed before the review event was detected, such as to indicate a lessening of the need to review the source code portion. In this way, a visual indicator may be replaced multiple times with visual indicators according to the predefined sequence after the occurrence of each review event in a series of review events associated with the source code portion.

In one example embodiment of the invention, code review tool 104 is configured as described hereinabove to display a visual indicator associated with a displayed source code portion in the context of a source code editing session associated with a first computer user, where the source code portion has an associated review status that indicates that the source code portion was added or modified by a second computer user. However, in this embodiment code review tool 104 is configured to display the visual indicator only if a predefined ranking exists indicating that the first user is senior to the second user.

In any of the example embodiments of the invention described herein, or in any combination thereof, code review tool 104 is preferably configured to provide an indication to source code control system 110 of a review event that was detected in the context of the source code editing session associated with a first user and in association with the source code portion that was added or modified by a second user.

Any of the elements shown in FIG. 1 are preferably implemented by one or more computers, such as computer 108, by implementing any of the elements shown in FIG. 1 in computer hardware and/or in computer software embodied in a non-transient, computer-readable medium in accordance with conventional techniques.

Figure 2:
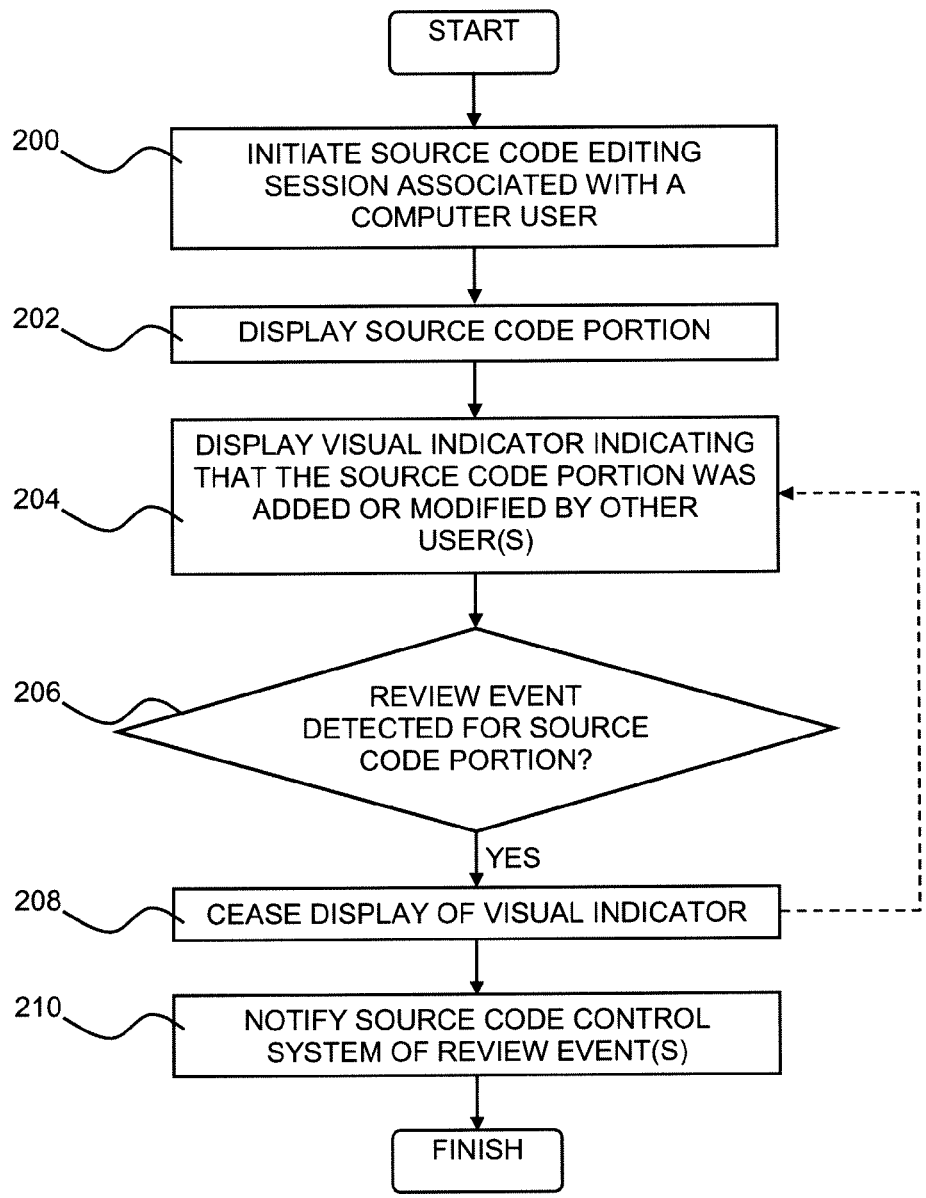
FIG. 2 is a simplified flowchart illustration of an example method of operation of the system of FIG. 1, operative in accordance with an example embodiment of the invention.

Reference is now made to FIG. 2 which is a simplified flowchart illustration of an example method of operation of the system of FIG. 1, operative in accordance with an example embodiment of the invention. In the method of FIG. 2, a source code editing session associated with a first computer user is initiated (step 200). During the source code editing session, a portion of the source code of a computer-based software application is displayed on a computer display (step 202), along with a visual indicator indicating that the source code portion was added or modified by one or more other computer users and requires review by the first user (step 204). The occurrence of a review event associated with the source code portion is detected (step 206). The display of the visual indicator is ceased after the review event is detected (step 208). Steps 204, 206, and 208 may be repeated for the source code portion for a series of review events, where a different visual indicator is displayed after each review event.

An indication may be provided to a source code control system that a review event was detected in the context of the source code editing session associated with the first user and in association with the source code portion (step 210).

Figure 3:
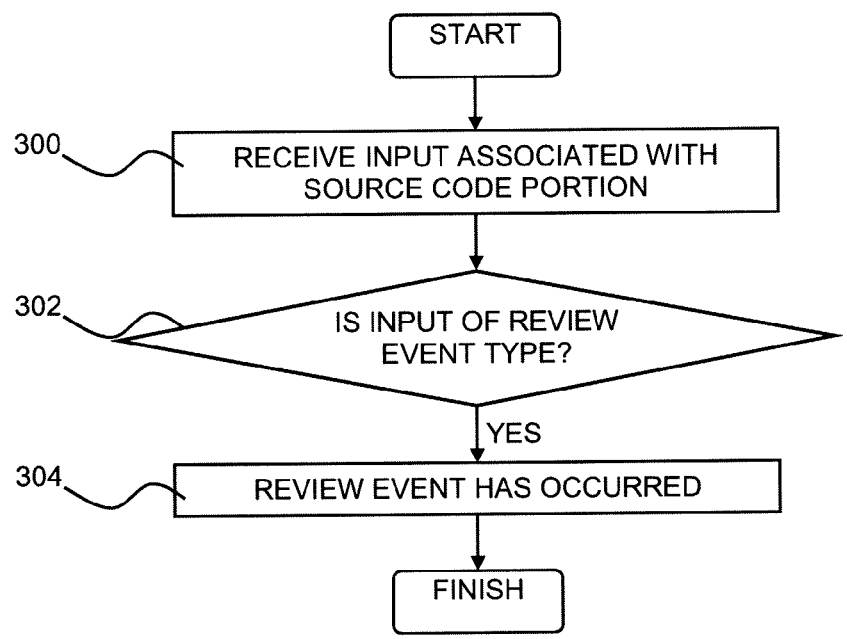
FIG. 3 is a simplified flowchart illustration of an example method of detecting a review event, operative in accordance with an example embodiment of the invention.

Reference is now made to FIG. 3, which is a simplified flowchart illustration of an example method of detecting a review event, operative in accordance with an example embodiment of the invention. In the method of FIG. 3, an input is received that is associated with a source code portion requiring review (step 300). If the input is of a predefined type that represents a review event (step 302), such as in the form of a mouse click on a displayed menu selection indicating that the first user has reviewed the source code portion, or in the form of a modification made by the first user to the source code portion, where changing the source code portion is considered tantamount to having reviewed the source code portion, then a review event has been detected (step 304).

Figure 4:
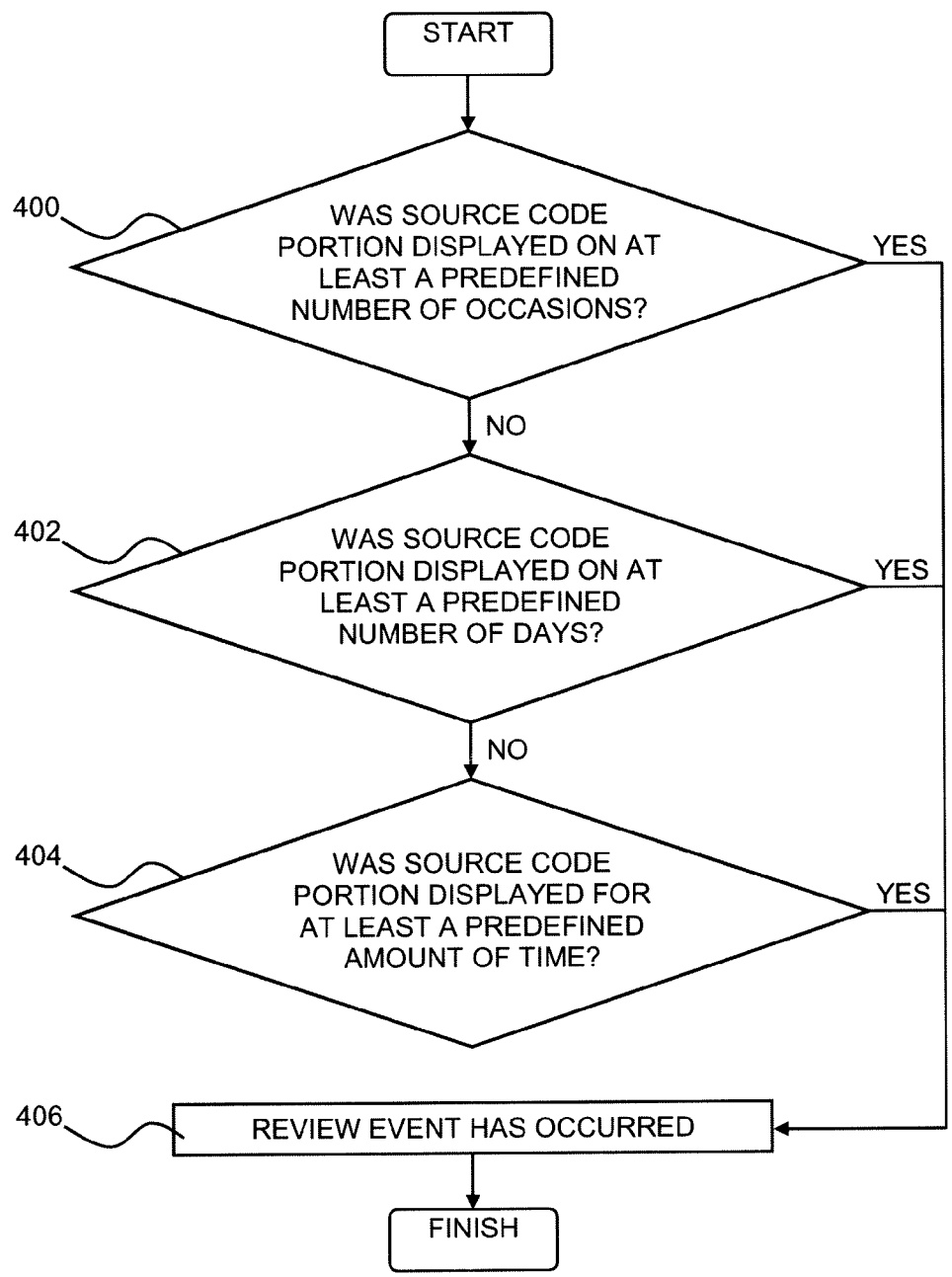
FIG. 4 is a simplified flowchart illustration of an example alternative method of detecting a review event, operative in accordance with an example embodiment of the invention.

Reference is now made to FIG. 4, which is a simplified flowchart illustration of an example alternative method of detecting a review event, operative in accordance with an example embodiment of the invention. In the method of FIG. 4, if a source code portion requiring review has been displayed in the context of at least one source code editing session associated with a user on at least a predefined number of occasions (step 400), or on at least a predefined number of days (step 402), or for at least a predefined amount of time (step 404), then a review event has been detected (step 406). The method of FIG. 4 may be modified to require specific combinations of steps 400, 402, and 404 before a review event is considered to have occurred.

Figure 5:
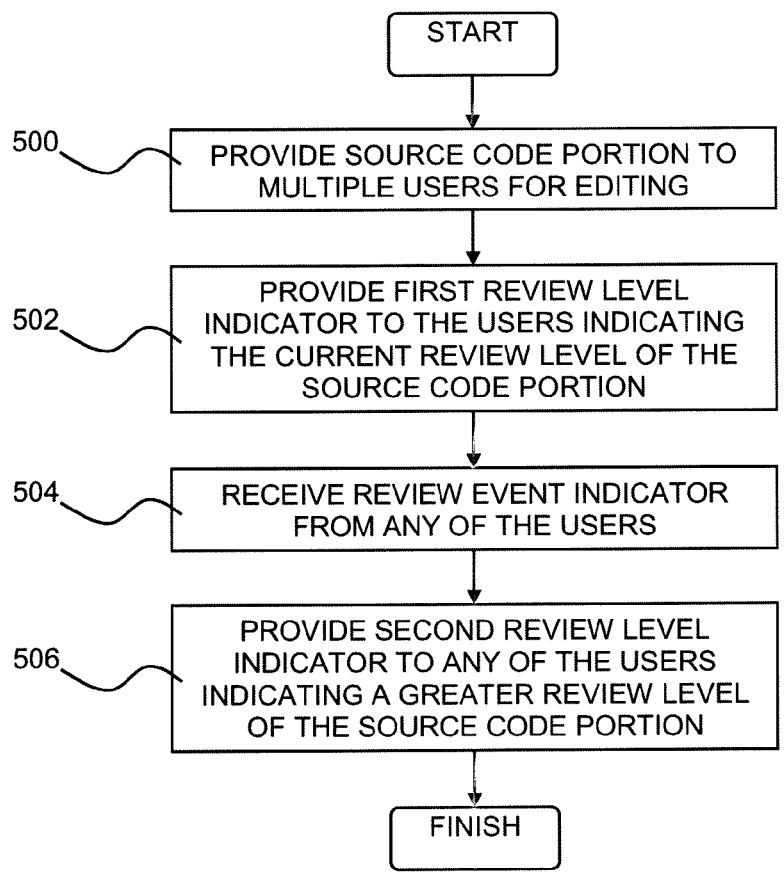
FIG. 5 is a simplified flowchart illustration of an example alternative method of operation of the system of FIG. 1, operative in accordance with an example embodiment of the invention.

Reference is now made to FIG. 5, which is a simplified flowchart illustration of an example alternative method of operation of the system of FIG. 1, operative in accordance with an example embodiment of the invention. In the method of FIG. 5, a source code portion of a computer-based software application is provided to multiple users for editing in multiple source code editing sessions (step 500), such as by source code control system 110 (FIG. 1). A first review level indicator is provided to each of the users, such as by source code control system 110, where each first review level indicator provided to a recipient user indicates that the source code portion was added or modified by a first user and that the source code portion is at a first level of review (step 502). A review event indicator is received from any of the users, such as from code review tool 104, where the review event indicator indicates that a review event related to the source code portion has occurred (step 504). A second review level indicator is provided to any of the users, such as by source code control system 110, where each second review level indicator provided to a recipient user indicates that the source code portion was added or modified by a first user and that the source code portion is at a second level of review that indicates a greater level of review than the first level of review (step 506). Review level indicators provided to a recipient user may indicate a level of review with respect to the recipient user only, or may indicate a consolidated level of review with respect to all of the multiple users.

In any of the example embodiments of the invention described herein, or in any combination thereof, the number of reviewers that reviewed any source code addition or modification may be tracked and reported. Source code file names may also be displayed in different colors depending on the number of review events they passed.

Reference is now made to FIG. 6, which is a simplified graphical user interface illustrating example features of the invention. In FIG. 6, a window 600 is shown in which visual indicators 602 and 604 are displayed to the left of corresponding portions of source code. A pop-up menu 606 is shown, having been activated by a mouse click on visual indicator 604, where any of several review action may be selected.

Figure 7:
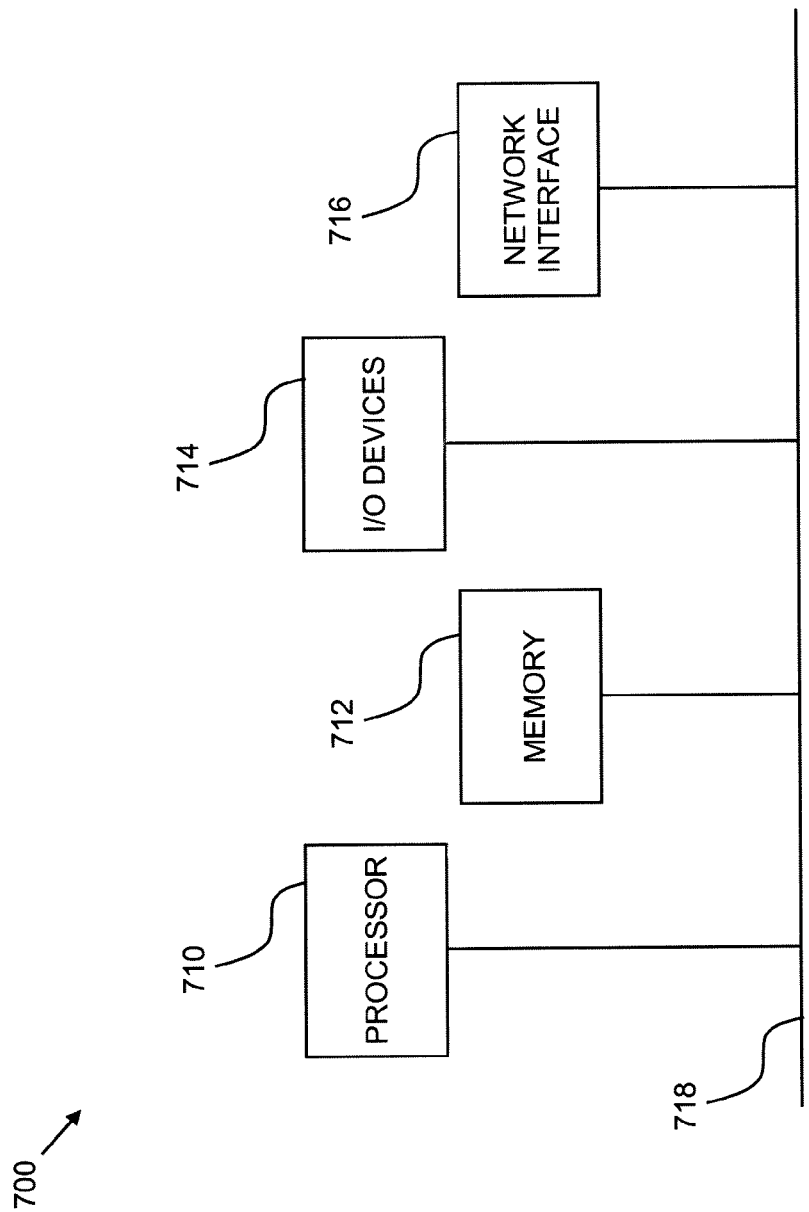
FIG. 7 is a simplified block diagram illustration of an example hardware implementation of a computing system, constructed and operative in accordance with an example embodiment of the invention.

Referring now to FIG. 7, block diagram 700 illustrates an example hardware implementation of a computing system in accordance with which one or more example components/methodologies of the invention (e.g., components/methodologies described in the context of FIGS. 1-6) may be implemented, according to an example embodiment of the invention.

As shown in FIG. 7, the techniques for controlling access to at least one resource may be implemented in accordance with a processor 710, a memory 712, I/O devices 714, and a network interface 716, coupled via a computer bus 718 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for code review, the method comprising:
 initiating a source code editing session associated with a first user, wherein the source code editing session is controlled by a computer-based source code editing tool that is configured to accept changes to source code of a computer-based software application during the source code editing session;
 displaying on a computer display, in the context of the source code editing session, a source code portion of the computer-based application;
accepting changes to the source code portion during the source code editing session;
 displaying on the computer display, in the context of the source code editing session, a visual indicator that is associated with the source code portion, and that indicates that the source code portion was added or modified by a second user;
detecting the occurrence of one or more review events associated with the source code portion; and
displaying a level of review that the source code portion has undergone since the addition or modification of the source code portion occurred.

2. The method of claim 1, and further comprising ceasing to display the visual indicator responsive to detecting the occurrence of the review event.

3. The method of claim 2, and further comprising displaying a different visual indicator responsive to detecting the occurrence of the review event.

4. The method of claim 3, wherein the displaying a different visual indicator step comprises displaying the different visual indicator where the different visual indicator is of a lighter shade than the visual indicator.

5. The method of claim 2, wherein the ceasing step comprises ceasing to display the visual indicator in response to the source code portion having been displayed for any of a) at least a predefined amount of time in the context of at least one source code editing session associated with the first user, b) at least a predefined number of occasions in the context of at least one source code editing session associated with the first user, and c) at least a predefined number of days in the context of at least one source code editing session associated with the first user.

6. The method of claim 1, wherein the detecting step comprises receiving an input that is of a predefined type that represents the review event.

7. The method of claim 6, wherein the receiving step comprises receiving the input in one of a) the form of an indicator indicating that the first user has reviewed the source code portion, and b) the form of a modification made by the first user to the source code portion.

8. The method of claim 1, wherein the displaying of the visual indicator comprises displaying the visual indicator in response to an occurrence of a predefined ranking that indicates the first user is senior to the second user.

9. The method of claim 1, and further comprising providing an indication of the review event to a source code control system.

10. A method for code review, the method comprising:
provided on a computer display a source code portion of a computer-based software application to a set of users for editing in a plurality of source code editing sessions;
providing a first review level indicator to each of the users in the set of users, wherein each first review level indicator indicates that the source code portion was added or modified by a first user and that the source code portion is at a first level of review;
receiving a review event indicator from any of the users in the set of users, wherein the review event indicator indicates that a review event related to the source code portion has occurred; and
providing a second review level indicator to each of the users in the set of users, wherein each second review level indicator indicates that the source code portion was added or modified by a first user and that the source code portion is at a second level of review that indicates a greater level of review than the first level of review.

11. The method of claim 10, wherein the providing review level indicator steps comprise providing where the review level indicators provided to a recipient one of the users indicates a level of review with respect to the recipient only.

12. The method of claim 10, wherein the providing review level indicator steps comprise providing where the review level indicators indicate a consolidated level of review with respect to all of the users.

* * * * *